United States Patent
Ye et al.

(10) Patent No.: US 11,516,053 B2
(45) Date of Patent: Nov. 29, 2022

(54) METHOD AND DEVICE FOR CHANNEL EQUALIZATION, AND COMPUTER-READABLE MEDIUM

(71) Applicant: Nokia Solutions and Networks Oy, Espoo (FI)

(72) Inventors: Chenhui Ye, Shanghai (CN); Xiaofeng Hu, Shanghai (CN); Dongxu Zhang, Shanghai (CN); Kaibin Zhang, Shanghai (CN)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 148 days.

(21) Appl. No.: 16/975,912

(22) PCT Filed: Feb. 27, 2019

(86) PCT No.: PCT/CN2019/076291
§ 371 (c)(1),
(2) Date: Nov. 23, 2020

(87) PCT Pub. No.: WO2019/165969
PCT Pub. Date: Sep. 6, 2019

(65) Prior Publication Data
US 2021/0091979 A1 Mar. 25, 2021

(30) Foreign Application Priority Data
Feb. 27, 2018 (CN) .......................... 201810162566.2

(51) Int. Cl.
*H04L 25/03* (2006.01)

(52) U.S. Cl.
CPC .. *H04L 25/03012* (2013.01); *H04L 25/03159* (2013.01); *H04L 25/03821* (2013.01)

(58) Field of Classification Search
CPC ......... H04L 25/03012; H04L 25/03159; H04L 25/03821; H04L 2025/03414; H04L 25/03165
See application file for complete search history.

(56) References Cited

U.S. PATENT DOCUMENTS

| | | | |
|---|---|---|---|
| 7,254,171 B2 * | 8/2007 | Hudson | H04L 1/0618 375/348 |
| 7,995,665 B2 | 8/2011 | Pare, Jr. et al. | |

(Continued)

FOREIGN PATENT DOCUMENTS

| | | |
|---|---|---|
| CN | 101312443 A | 11/2008 |
| CN | 105553898 A | 5/2016 |

(Continued)

OTHER PUBLICATIONS

International Search Report for PCT/CN2019/076291 dated May 22, 2019.

*Primary Examiner* — Vineeta S Panwalkar
(74) *Attorney, Agent, or Firm* — Fay Sharpe LLP (57) ABSTRACT

Embodiments of the present disclosure provide a method, device, and computer readable medium for channel equalization. The method comprises receiving, at a first device, a first signal from a second device via a plurality of subcarriers over a communication channel; sampling the first signal to obtain sampled symbols; and generating a second signal based on the obtained sampled symbols using a direct association between sampled symbols and payloads, the second signal indicating a payload of the first signal carried on an effective subcarrier of the plurality of subcarriers. Through the use of the direct association between sampled symbols and payloads, it is possible to achieve channel equalization in a less complicated, more reliable, and cost-effective manner, so as to extract the payload in the received signal.

24 Claims, 7 Drawing Sheets

(56) References Cited

U.S. PATENT DOCUMENTS

2009/0110049 A1* 4/2009 Luschi ................ H04L 25/0212
375/232
2016/0072648 A1* 3/2016 Strong .................. H04L 1/0003
375/285

FOREIGN PATENT DOCUMENTS

WO      WO 01/67697 A2    9/2001
WO      WO 01/67697 A3    9/2001

* cited by examiner

METHOD AND DEVICE FOR CHANNEL EQUALIZATION, AND COMPUTER-READABLE MEDIUM

FIELD

Embodiments of the present disclosure generally relate to the field of communications, and more specifically, to a method, device, and computer readable medium for channel equalization.

BACKGROUND

In a telecommunication process, a transmitter performs corresponding processing operations (such as modulation and coding) on a signal before transmitting the signal, and transmits the processed signal to a receiver over a communication channel. During the processing at the transmitter and the signal transmission, the signal may undergo various impairments, resulting in the introduction of noise and/or distortion. In order to recover payload data from the received signal, the receiver generally utilizes a corresponding equalization algorithm to reduce or lower those impairments.

In some communication systems, especially in wireless communication systems (with extremely valuable spectrum resources) and backbone transmission systems (such as optical fiber communication systems, which are featured with maintaining reliability and capacity in long-distance transmission), a solution is employed to model the channel and perform compensation based on a result of the modeling. Although some accurate channel models have been developed to describe an entire communication link through which the signal is passed, this solution still has limitations in terms of reliability, computational complexity, and costs. Therefore, it is desirable to provide a solution to implement channel equalization with better reliability and lower computational complexity and costs.

SUMMARY

Embodiments of the present disclosure provide a solution for channel equalization.

In a first aspect of the present disclosure, there is provided a method for channel equalization. The method comprises: receiving, at a first device, a first signal from a second device via a plurality of subcarriers over a communication channel; sampling the first signal to obtain sampled symbols; and generating a second signal based on the obtained sampled symbols using a direct association between sampled symbols and payloads, the second signal indicating a payload of the first signal carried on an effective subcarrier of the plurality of subcarriers.

In a second aspect of the present disclosure, there is provided a device for channel equalization. The device comprises a processor; and a memory coupled to the processor and having instructions stored therein. The instructions, when executed by the processor, cause the device to perform acts of: receiving a first signal from a further device via a plurality of subcarriers over a communication channel; sampling the first signal to obtain sampled symbols; and generating a second signal based on the obtained sampled symbols using a direct association between sampled symbols and payloads, the second signal indicating a payload of the first signal carried on an effective subcarrier of the plurality of subcarriers.

In a third aspect of the present disclosure, there is provided a computer readable medium. The computer readable medium has computer executable instructions stored thereon which, when executed by one or more processors, cause the one or more processors to perform the method of the above first aspect.

It will be appreciated that this Summary is not intended to identify key features or essential features of the present disclosure, nor is it intended to be used to limit the scope of the present disclosure. Other advantages resulting from the example embodiments of the present disclosure will be made apparent by the following description.

BRIEF DESCRIPTION OF THE DRAWINGS

Through the following detailed description with reference to the accompanying drawings, the above and other features, advantages, and aspects of various embodiments of the present disclosure will become more apparent. Throughout the drawings, the same or similar reference symbols are used to indicate the same or similar elements, in which.

Throughout the drawings, the same or similar reference symbols are used to indicate the same or similar elements.

DETAILED DESCRIPTION OF EMBODIMENTS

Embodiments disclosed herein will now be described in detail with reference to the drawings. It should be appreciated that the present disclosure can be implemented in various ways and should not be limited to the embodiments discussed herein. Rather, those embodiments are provided for a thorough and complete understanding of the subject matter described herein. It should be appreciated that the drawings and embodiments are provided merely for the purpose of illustration, without suggesting any limitations on the scope of the subject matter.

As used herein, the term "includes" and its variants are to be read as open-ended terms that mean "includes, but is not limited to." The term "based on" is to be read as "based at least in part on." The term "one embodiment" or "this embodiment" is to be read as "at least one embodiment." The terms "first," "second," and the like may refer to different or the same objects. Other definitions, explicit and implicit, may be included below.

As used herein, the term "network device" refers to a node or other entity in a communication network that has a specific function. "Base station" (BS) refers to a node B (NodeB or NB), an evolved NodeB (eNodeB or eNB), a remote radio unit (RRU), a radio header (RH), a remote radio head (RRH), a relay, a low power node such as a femto station and a pico station, and the like.

As used herein, the term "terminal device" refers to any end device that is capable of wired or wireless communication with other terminal devices or with a network device. As some examples, the terminal device may include an aircraft, a mobile terminal (MT), a subscriber station (SS), a portable subscriber station (PSS), a mobile station (MS), or an access terminal (AT), and any of the above devices on board. The terminal device may be any type of mobile terminal, fixed terminal or portable terminal, including a mobile telephone, a station, a unit, a device, a multimedia computer, a multimedia tablet, an Internet node, a communicator, a desktop computer, a laptop computer, a notebook computer, a netbook computer, a tablet computer, a personal communication system (PCS) device, a personal navigation device, a personal digital assistant (PDA), an audio/video player, a digital camera/video camera, a positioning device, a TV receiver, a radio broadcast receiver, an E-book device, a gaming device, an Internet-of-Things (IoT) device or any other device capable of communication, or any combination thereof.

Figure 1:
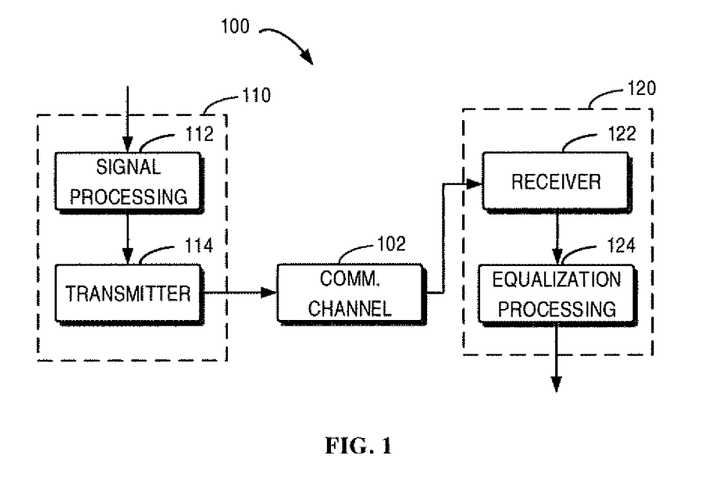
FIG. 1 is a diagram illustrating a communication system in which embodiments described herein may be implemented.

FIG. 1 depicts a communication system 100 in which embodiments of the present disclosure may be implemented. The communication system 100 comprises a device 110 and a device 120 which can communicate with each other to convey traffic data, control information, and the like. In the example of FIG. 1, the device 110 sends a signal to the device 120, and the signal sent by the device 110 is broadcasted via a communication channel 102 to the device 120.

At the transmitter side, the device 110 performs processing on payload data to be transmitted. The processing is performed by a signal processing module 112 as shown in FIG. 1. The signal processing module 112 may perform various processing operations on the data to be transmitted, including one or more of pre-processing, modulation, frequency-time transformation, addition of a cyclic prefix, amplification, and the like. The device 110 further includes a transmitter 114 to transmit the processed signal to the device 120 via the communication channel 102.

At the receiver side, the device 120 includes a receiver 122 to receive the signal transmitted over the communication channel 102. Since the payload data sent by the device 110 has experienced the signal processing by the device 110, the transmission of the transmitter, link transmission, and the reception by the receiver before it arrives the device 120, the payload data may suffer from various impairments during those procedures, which may cause noise instruction, distortion, and the like. In such case, the device 120 further includes an equalization processing module 124 to perform equalization on the signal received by the receiver 122 so as to determine the payload sent by the device 110.

The communication system 100 may be a wired communication system or a wireless communication system, and accordingly the communication channel 102 may be a wired communication channel or a wireless communication channel. Examples of the wired communication system may include a backbone transportation network, such as an optical fiber communication network (an active optical network or a passive optical network), an analog fronthaul communication network, and the like. Examples of the wireless communication system may include any radio communication system. Communications in the communication system 100 may be implemented according to any suitable communication protocol(s), including, but not limited to, cellular communication protocols of the first generation (1G), the second generation (2G), the third generation (3G), the fourth generation (4G) and the fifth generation (5G) and/or the like, wireless local network communication protocols such as Institute for Electrical and Electronics Engineers (IEEE) 802.11 and/or the like, and/or any other protocols currently available or to be developed in the future.

The devices 110 and 120 may be any devices that can communicate in the communication system 100. For example, in a wireless communication system, the device 110 may be one of a network device and a terminal device (for example, UE), and the device 120 may be the other one of the network device and the terminal device. In an optical fiber-based communication, the device 100 may be one of an optical line terminal (OLT) and an optical network unit (ONU), and the device 120 may be the other one of the OLT and the ONU.

It should be appreciated that although FIG. 1 illustrates that the device 110 sends a signal to the device 120, in other examples, the device 120 can also send a signal to the device 110. In such examples, the device 120 may have some functionalities of the device 110 as described above with reference to FIG. 1, and the device 110 may have some functionalities of the device 120 as described above with reference to FIG. 1.

Figure 2A:
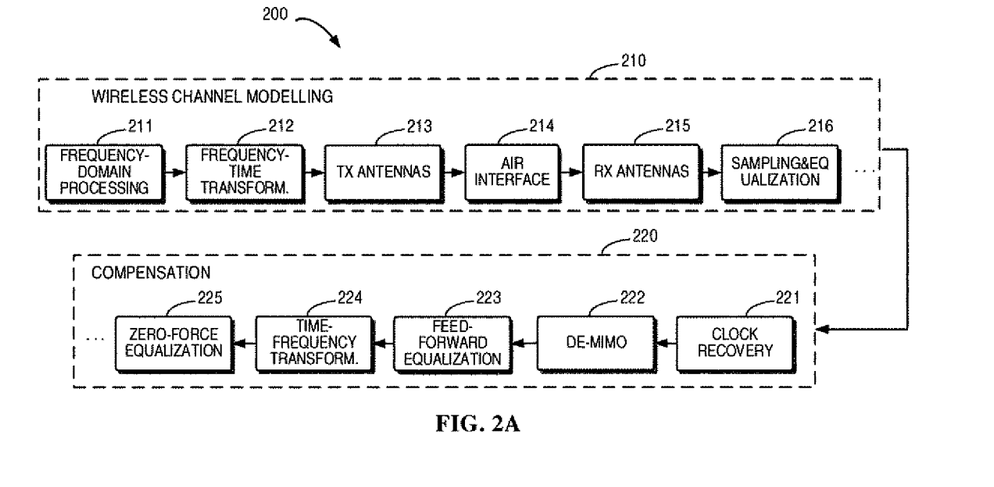
FIG. 2A and FIG. 2B illustrate schematic diagrams of conventional systems for channel equalization.
Figure 2B:
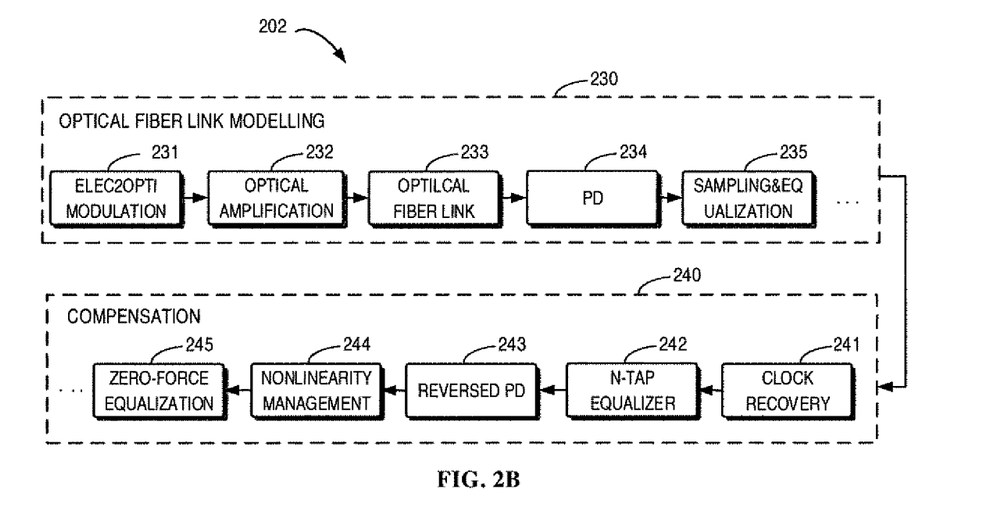

In order to perform equalization processing at the receiver side, various systems employ some solutions utilizing channel modeling and compensation based on the result of the modeling. In those solutions, cascaded modules are used to describe the whole communication link through which the signal is passed, and further cascaded modules are used for compensation from different aspects. FIG. 2A and FIG. 2B show equalization processing systems for channel modeling and compensation in a wireless communication system and a wired communication system, respectively.

In an equalization processing system 200 illustrated in FIG. 2A, a wireless channel modeling module 210 and a compensation module 220 are included in the equalization processing system 200. The wireless channel modeling module 210 includes a plurality of sub-modules to model the processing and the channel experienced by the received signal. Specifically, a pre-processing sub-module 211 is configured to model the pre-processing at the transmitting end, such as frequency domain pre-processing of the signal; a frequency-time transformation sub-module 212 is configured to model frequency-time transformation at the transmitting end, such as the inverse fast Fourier transform (iFFT); a transmitting (TX) antenna sub-module 213 is configured to model multiple input multiple output (MIMO) and/or power leakage experienced at a transmitting antenna(s); an air interface sub-module 214 is configured to model frequency-domain and time-domain impairments experienced during the propagation over the wireless channel; a receiving (RX) antenna sub-module 215 is configured to model power leakage or a phase shift introduced in the signal reception at the receiving end; a sampling and equalization sub-module 216 is configured to model the inter-symbol interference (ISI) during the communication. The wireless channel modeling sub-module 210 may further include more other sub-modules as needed to model other processing experienced by the signal.

According to the modeling result of the wireless channel modeling module 210, the compensation module 220 includes a plurality of cascaded sub-modules to compensate the signal from different aspects so as to achieve channel equalization. Specifically, a clock recovery sub-module 221 is configured to suppress the ISI; a de-MIMO sub-module 222 is configured to suppress the inter-carrier interference (ICI); a feed-forward equalization sub-module 223 is configured to implement time-domain processing; a time-frequency transformation sub-module 224 is configured to perform time-frequency transformation (for example, FFT); and a zero-force equalization sub-module 225 is configured to enable a linear step size. The compensation module 220 may further include more other sub-modules as needed to compensate the signal from other aspects.

An equalization processing system 202 shown in FIG. 2B is suitable for an optical fiber-based communication network. The equalization processing system 202 includes an optical fiber link modeling module 230 which comprises a plurality of sub-modules to model the processing and the channel experienced by the received signal. Specifically, an electro-to-optical ("elec2opti") modulation sub-module 231 is configured to model electrical-to-optical signal modulation at the transmitting end; an optical amplification sub-module 232 is configured to model optical amplification at the transmitting end to determine nonlinear distortion that might be introduced; an optical fiber link sub-module 233 is configured to model the optical fiber link to determine possible distortion introduced in the optical fiber link; a photo-detection (PD) sub-module 234 is configured to model the phase-to-power conversion at the receiving end; and a sampling and equalization sub-module 235 is configured to model the inter-symbol interference (ISI) during the communication. The optical fiber link modeling sub-module 230 may further include more other sub-modules as needed to model other processing experienced by the signal.

According to the modeling result of the optical fiber modeling module 230, a compensation module 240 includes a plurality of cascaded sub-modules to compensate the signal from different aspects so as to achieve channel equalization. Specifically, a clock recovery sub-module 241 is configured to implement re-alignment; an N-tap equalizer 242 is configured to suppress the ISI; a reversed photo-detection (PD) sub-module 243 is configured to determine the reversed response; a nonlinearity management sub-module 244 is used to determine a reversed optical amplification response; and a zero-force equalization sub-module 245 is configured to perform frequency-domain compensation. The compensation module 240 may further include more other sub-modules as needed to compensate the signal from other aspects.

Conventional solutions, including the examples shown in FIG. 2A and FIG. 2B, have limitations in reliability, complexity and costs. First, regarding the reliability, since all types of impairments in the received signal are coupled with each other, the quality of data transmission can be ensured in some special use cases (for example, with good linearity), thereby ensuring the reliability or effectiveness of the equalization processing result. In this aspect, it is further proposed to limit the communication system to operate as a small signal model (SSM) so that the communication link may not introduce the problem of nonlinearity. However, the SSM-based solution is implemented at the expense of power consumption, which is not acceptable in multi-point access scenarios like PON or indoor distributed antenna system fronthaul network because these scenarios require a transmitting signal at a high power level to ensure that multiple receivers can all receive the signal.

In addition, the conventional solutions have very high requirements for computational complexity. In order to ensure the performance of modeling and compensation, it is proposed to use more sophisticated algorithms based on regression or iteration, such as maximum likelihood estimation for a bit sequence. As a result, those solutions are limited by the computational capability of the processing device and thus it may be difficult to implement those solutions by a cost-effective processing device, such as by a digital signal processing (DSP) unit. In this case, it is difficult for these solutions to be applied to a wired communication network, an optical fiber communication network, or an analog fronthaul communication network that is cost-sensitive, or the like.

In some other conventional solutions, artificial intelligence (AI)-based technologies have been proposed to solve the problem of channel equalization. An advantage of the AI-based solution is its capability to optimize posterior possibility estimation without a complete prior awareness of the channel model, thereby leading to higher performance. In addition, after sufficient leaning, the resulting model has reduced requirements for computational complexity. Thus, this solution can be implemented by a cost-effective processing device such as a DSP. However, the proposed solutions are mainly restricted to channel equalization for a single-carrier formatted signal, so the channel equalization may be executed for a single-carrier formatted signal in the time domain entirely. However, a solution for channel equalization for a multi-carrier formatted signal has not yet been proposed.

According to embodiments of the present disclosure, a solution is proposed for channel equalization. This solution is suitable for channel equalization on a signal transmitted based on a plurality of carriers. A device at a receiving end receives a signal from another device via a plurality of subcarriers over a communication channel, and samples the received signal to obtain sampled symbols. A further signal is generated based on the obtained sampled symbols using a predefined direct association between sampled symbols and payloads, the further signal indicating a payload of the received signal carried on an effective subcarrier of the plurality of subcarriers. By using the predefined (learnt) direct association between sampled symbols and payloads, it is possible to avoid the problem of nonlinear impairments caused when different cascaded modules implement channel equalization from different aspects. In addition, the use of the direct association allows the channel equalization to be completed in a less complicated, more reliable and cost-effective way, to extract the payload from the received signal.

As used herein, "channel equalization" refers to suppressing or eliminating, at the receiving end, impairments such as noise and distortion introduced in the received signal, so as to obtain the payload expected to be transmitted from the transmitting end.

Example embodiments of the present disclosure will be described in detail below with reference to the accompanying drawings.

Figure 3:
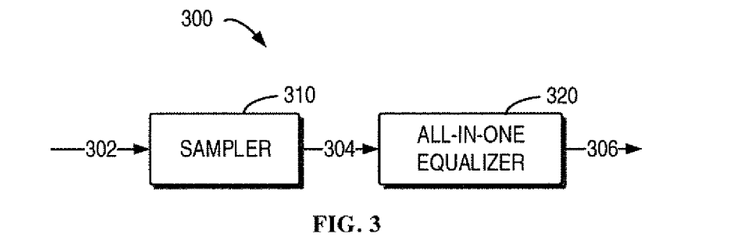
FIG. 3 illustrates a schematic diagram of a system for channel equalization in accordance with some embodiments of the present disclosure.

FIG. 3 illustrates a schematic diagram of a system for channel equalization in accordance with some embodiments of the present disclosure. The system 300 may be implemented at the device 120 of the receiving end in FIG. 1, for example, implemented at the equalization processing module 124. For ease of discussion, the system 300 will be described with reference to FIG. 1.

The system 300 includes a sampler 310 for obtaining a signal 302 (for ease of discussion, also referred to as a first signal) from the receiver 122 of the device 120. Generally, the first signal 302 is a frequency-domain signal. The sampler 310 samples the signal 302 to obtain a series of sampled symbols 304. In embodiments of the present disclosure, the receiver 122 of the device 120 receives the signal 302 from the device 110 via a plurality of subcarriers over the communication channel 102. Depending on the processing for the plurality of subcarriers, the signal 302 may be an orthogonal frequency division multiplexing (OFDM) modulated signal, a discrete multi-tone (DMT) modulated signal, or the like.

Before the signal 302 is sampled, impairments such as noise and distortion may have been caused at the device 110 of the transmitting end, at the communication channel 102, and at the device 120 of the receiving end. For example, the device 110 may expect to send a payload to the device 120. To ensure effective transmission, the device 110 may perform some processing on the payload, including frequency-domain pre-processing, frequency-time transformation (such as iFFT), addition of a cyclic prefix (CP), amplification, antenna transmission, and/or the like. After such processing, binary data representing the payload is modulated to respective subcarriers and transformed into a time-domain signal to be transmitted over the communication channel 102. The processing in the device 110, the propagation along the communication channel 102, and the signal reception at the device 120 may all cause the impairments in the signal 302.

The system 300 further includes an all-in-one equalizer 320 to obtain the sampled symbol(s) 304 from the sampler 310 and generate a signal 306 (for convenience of discussion, referred to as a second signal) based on the obtained sampled symbol(s) 304 by using a predefined direct association between sampled symbols and payloads. The signal 306 indicates the payload of the first signal carried on an effective subcarrier(s) of the plurality of subcarriers. The payload is the data expected to be transmitted from the device 110 to the device 120. The signal 306 may be considered as a frequency-domain signal. By means of the all-in-one equalizer 320, channel equalization may be performed on the sampled symbol(s) 304 that has experienced various impairments (such as noise and distortion), to extract the payload sent from the device 110.

According to the embodiments of the present disclosure, by using the direct association between sampled symbols and payloads, the sampled symbol(s) may be directly mapped to a payload without taking care of various intermediate cascaded processing to transform the sampled symbol(s) in the time domain to the payload in the frequency domain. As compared with the solution of using multiple cascaded modules to model the communication channel and perform corresponding compensation, the use of the direct association between sampled symbols and payloads can avoid the problem of nonlinear impairments caused when the different cascaded modules implement the channel equalization in different aspects. The impairments caused by other processing to be performed on the signal before the equalization processing and by the physical environment may be considered as a "black box". The all-in-one equalization can directly implement the mapping from the sampled symbol(s) to the expected payload, without requiring the prior knowledge about the system and the sophisticated algorithm used for channel modeling and compensation, and even without performing the time-frequency transformation of the signal. In this way, the channel equalization may be implemented with less complexity, more reliability, and lower costs. As a result, the channel equalization solution disclosed herein may also be advantageously applied to a cost-sensitive wired communication network, such as an optical fiber communication network, an analog fronthaul communication network, or the like.

In some embodiments, the direct association between sampled symbols and payloads may be learned from the sampled symbols and payloads known in advance. Thus, in some implementations, a learning model (hereinafter referred to as a channel equalization model) may be constructed, and the known sampled symbols and payloads may be used to determine a parameter set of the learning model to indicate the direct association between the sampled symbols and the payloads.

Figure 4:
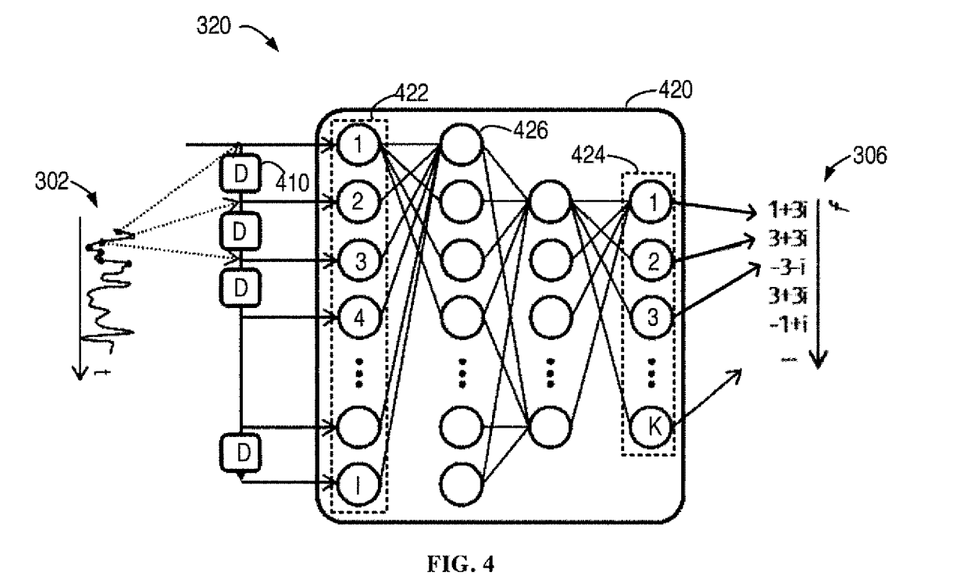
FIG. 4 illustrates a schematic diagram of a channel equalization model used for implementing the all-in-one equalizer in FIG. 3 in accordance with some embodiments of the present disclosure.

FIG. 4 illustrates example architecture of the all-in-one equalizer 320 according to some embodiments of the present disclosure. In the example of FIG. 4, the all-in-one equalizer 320 includes a channel equalization model 420 to generate the output payload on the effective subcarrier(s) based on the input sampled symbols. The channel equalization model 420 may be constructed as a multi-layer learning network. As used herein, the term "learning network" refers to a model that can learn, from training data, an association between the corresponding input and output, and thus is capable of processing a given input to generate its corresponding output based on the parameter set obtained from the training after the training is completed. The term "learning network" may sometimes be referred to as "neural network", "learning model", "network", or "model". These terms are used interchangeably herein.

The channel equalization model 420 includes an input layer 422, an output layer 424, and one or more hidden layers between the input layer 422 and the output layer 444. Each layer in the channel equalization model 420 includes a plurality of nodes 426 (also referred to as neurons), each node applying a corresponding excitation function to process its input to determine an output. The layers of the channel equalization model 420 are arranged in a hierarchical structure, and the output from a previous layer is adjusted with the parameter to be provided as an input to a next layer. The nodes at different layers may be fully connected (i.e., each node of a next layer is connected to all nodes of its previous layer), non-fully connected (i.e., each node of the next layer is connected to some of the nodes of the previous layer), or have a one-to-one connection (i.e., each node in the next layer is connected to one node in the previous layer). There are signal pathways between the connected nodes in the adjacent layers. The parameter set of the channel equalization model 420 includes parameters for mapping the input sampled symbols to the input layer 422, parameters for mappings between the adjacent layers in the channel equalization model 420, and parameters for mapping the output of the output layer 424 to the payload.

In some embodiments, the number of nodes (represented as 1) in the input layer 422 of the channel equalization model 420 may be determined by a parameter of the frequency-time transformation and a length of the cyclic prefix for the device 110. In an example, the number of nodes in the input layer 422 may be equal to a sum of the size of the frequency-time transformation (for example, the length of iFFT) and the length of the cyclic prefix. As a specific example, if the size of the frequency-time transformation in the device 110 of the transmitting end is 1024 and the length of the cyclic prefix is 176, the number of nodes in the input layer may be 1200.

In some embodiments, the number of nodes (represented as K) in the output layer 424 of the channel equalization model 420 may be determined based on the number of effective subcarriers. Generally, if the device 110 and the device 120 are allocated with a plurality of subcarriers for communication, the device 110 may select some or all of the subcarriers as effective subcarriers and arrange the payload to be carried on these effective subcarriers. Since the object of the channel equalization model 420 is to output the payload on the effective subcarriers, the number of nodes in the output layer may be the same as the number of effective subcarriers. For example, if the size of the frequency-time transformation is 1024, it means that the number of all the subcarriers is 1024. However, the device 110 may select a portion of all 1024 subcarriers to carry the payload (for example, 600 subcarriers, 800 subcarriers, 1000 subcarriers, or the like). The number of nodes in the input layer 422 of the determined channel equalization model 420 is usually greater than the number of nodes in the output layer 424, and thus the channel equalization model 420 is such a model with a wide time-domain input and a narrow frequency-domain output.

Since the signal 302 is received by the device 110 in the time domain, it may be represented with a voltage or current amplitude waveform, as shown in FIG. 4. The sampler 310 may continuously perform sampling on the signal 302 in the time domain to obtain a series of sampled symbols 304 at different time points. The all-in-one equalizer 320 may further include a plurality of delay units 410 to delay the previously sampled symbols. After the sampler 310 samples a predetermined number of sampled symbols 304, the delayed sampled symbols are simultaneously mapped to the input layer 422. It should be appreciated that although the number of sampled symbols 304 is shown to be the same as the number of nodes of the input layer 422 in the example of FIG. 4, the number of sampled symbols 304 may be greater or less than the number of nodes of the input layer 422 in other examples, and the sampled symbols may be mapped with parameters to the corresponding nodes of the input layer 422.

As mentioned above, the parameter set of the channel equalization model 420 may be determined using known sampled symbols and payloads, which involves a model training process and will be described in detail below. In the case where the parameter set of the channel equalization model 420 has been determined, the device 120 may use the channel equalization model 420 to perform channel equalization to determine the payload from the received signal 302. The output signal 306 of the channel equalization model 420 may comprise the output(s) of the respective output node(s), where an output of each output node indicates a payload carried on one effective subcarrier. As shown in the example of FIG. 4, the payload carried on each effective subcarrier can be represented with a complex value.

It should be appreciated that although FIG. 4 illustrates an example structure of the channel equalization model 420, this example is provided merely for the purpose of illustration. In other examples, the channel equalization model 420 may be constructed with more layers, more nodes, and/or other structures. It should also be appreciated that in addition to the multi-layer learning network, the channel equalization model 420 may also be constructed with other model structures. The embodiments of the present disclosure are not limited in this respect.

Figure 5:
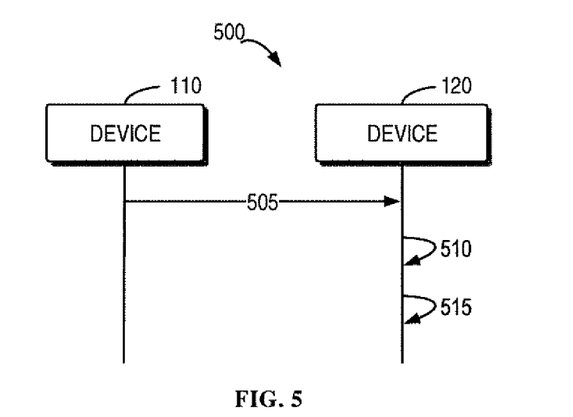
FIG. 5 illustrates a schematic diagram of a process for channel equalization in accordance with some embodiments of the present disclosure.

FIG. 5 shows a flowchart of a process 500 for channel equalization in accordance with some embodiments of the present disclosure. The process 500 involves the device 110 and the device 120 of FIG. 1. The process 500 is related to implementing channel equalization at the receiving end using the determined direct association between sampled symbols and payloads.

At 505, the device 110 transmits the signal 302 to the device 120 via a plurality of subcarriers over a communication channel. The signal 302 is a time-domain signal. The device 120 receives the signal 302 using the receiver 122, and samples the signal 302 using the sampler 310 to obtain the sampled symbols 304. The all-in-one equalizer 320 of the device 120 then generates the signal 306 based on the sampled symbols 304 of the signal 302 using the predefined direct association between sampled symbols and payloads, the signal 306 indicating the payload carried on the effective subcarrier(s). The all-in-one equalizer 320 may use the channel equalization model 420 shown in FIG. 4 to generate the signal 306. The parameter set of the channel equalization model 420 indicates the direct association between the input sampled symbols and the output payload.

The implementations of channel equalization by the device 120 have been described above with the direct association between sampled symbols and payloads (for example, the parameter set of the channel equalization model 420) being determined. The determination of such a direct association will be described in detail below.

In an embodiment of the present disclosure, determining the direct association between sampled symbols and payloads involves learning a mapping relationship between the two from the known inputs and outputs. An objective of the learning is to make the direct association to be used to generate a payload based on the input sampled symbols. Therefore, the training data used for determining the direct association may include known sampled symbols and payloads corresponding to these sampled symbols. In a communication system, as the channel conditions between different devices are different, the configurations or setting parameters of the devices are different, and the sampled transmission resources may also be different, it may be difficult to determine the direct association offline with the known data and make the direct association suitable for channel equalization in all scenarios. In some embodiments, the direct association between sampled symbols and payloads may be determined online, making the determined direct association better suited to channel equalization of a signal transmitted from the device 110 to the device 120.

Figure 6:
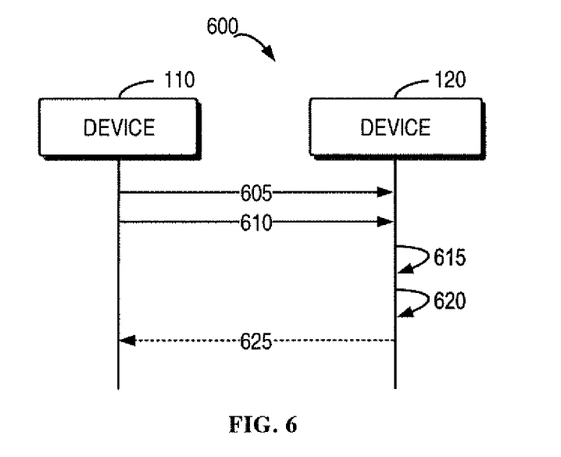
FIG. 6 illustrates a schematic diagram of a process for determining a direct association in accordance with some embodiments of the present disclosure.
Figure 7:
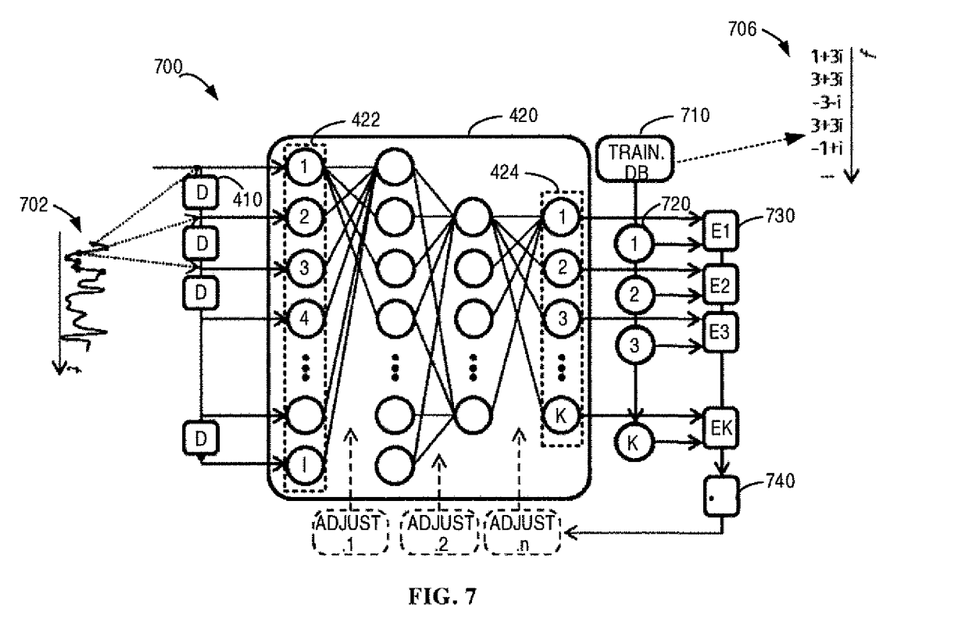
FIG. 7 illustrates a schematic diagram of a system for training the channel equalization model in FIG. 4 in accordance with some embodiments of the present disclosure.

Reference will now be made to FIG. 6 and FIG. 7 to discuss examples of online determination of the direct association between sampled symbols and payloads. FIG. 6 illustrates a flowchart of a process 600 for determining the direct association in accordance with some embodiments of the present disclosure. The process 600 involves the device 110 and the device 120 of FIG. 1.

At 605, the device 110 transmits a training signal to the device 120 via a plurality of subcarriers over the communication channel 102. The training signal is used for the purpose of determining the direct association between sampled symbols and payloads. In some embodiments, the device 110 processes the payload of the training signal and transmits it in the same way as in subsequent normal communication. In addition, the communication channel 102 and the plurality of subcarriers used for transmission of the training signal are also the same as those used in the subsequent normal communication between the device 110 and the device 120. In this way, the direct association for channel equalization can be better suited to the communication between the device 110 and the device 120.

At 610, the device 110 further sends a reference signal to the device 120, where the reference signal indicates a payload of the training signal carried on the effective sub-carrier(s). The reference signal may be used by the device 120 to determine the direct association. Unlike the training signal, the device 110 does not perform additional processing on the reference signal, such as frequency-domain pre-processing, frequency-time transformation, addition of a cyclic prefix, amplification, and the like. Instead, the device 110 directly sends the payload to the device 120. In some embodiments, the device 110 may directly send the reference signal to the device 120. In some other embodiments, the device 110 may send the reference signal to the device 120 via other devices. Although the reference signal is described as being sent from the device 110 to the device 120 in the example of FIG. 6, in other examples, the reference signal may also be pre-configured in the device 120. In those examples, the step 610 in the process 600 may be omitted.

The device 120 receives the training signal and the reference signal. At 615, the device 120 samples the received training signal to obtain training sampled symbols. At 620, the device 120 determines the direct association based on the training sampled symbols and the reference signal. The device 120 may determine the direct association through a variety of training algorithms. The determination of the direct association may depend on the constructed model for representing the direct association. During the training process of the channel equalization model 420 in FIG. 4, the determination of the direct association may be implemented using various machine learning algorithms, such as a stochastic gradient descent algorithm, a backward propagation algorithm, and the like.

In the example of the channel equalization model 420 in FIG. 4, since the number of nodes in the input layer of the channel equalization model 420 is related to the parameter of the frequency-time transformation and the length of the cyclic prefix for the device 110, and the number of nodes in the output layer is related to the number of effective sub-carriers selected by the device 110 for payload transmission, in some embodiments, the device 110 may receive, from the device 120, information (referred to as "first information") indicating the parameter of the frequency-time transformation and the length of the cyclic prefix and information (referred to as "second information") indicating the number of effective subcarriers. In some embodiments, the parameter of frequency-time transformation, the length of the cyclic prefix, and the number of effective subcarriers used in the device 110 may be pre-configured to the device 120 and thus the reception from the device 110 is not required.

In some embodiments, after the direct association between sampled symbols and payloads has been determined, the device 120 may also send a confirmation indication to the device 110 at 625 to indicate that the direct association has been determined. After receiving such a confirmation indication, the device 110 may initiate normal transmission with the device 120.

FIG. 7 shows a schematic diagram of a system 700 for training the channel equalization model 420 of FIG. 4. In the system 700, the architecture of the channel equalization model 420 has been constructed, including the number of layers of the model, the number of nodes in each layer, and the node connections between the layers. Then, the parameter set of this model may be determined through a training process, such as the process 600 described in FIG. 6.

Specifically, in the initial stage, the parameter set of the channel equalization model 420 is initialized. The training signal 702 received by the device 110 is sampled (for example, by the sampler 310) to obtain the training sampled symbols. Since the training signal 702 is a time-domain signal, the training sampled symbols at earlier time points are delayed by the respective delay units 410. After being obtained from the sampling, the training sampled symbols of the corresponding number are input to the input layer 422 of the channel equalization model 420. The training sampled symbols are mapped to the output layer 424 via the current parameter set of the channel equalization model 420 to obtain the current payload output. The system 700 includes a training database (DB) 710 in which a reference signal 706 corresponding to the training signal 702 (i.e., a payload on the corresponding effective subcarrier(s)) is stored. The system 700 further includes a plurality of transfer elements 720. The training DB 710 provides the payload indicated by the reference signal 706 to a corresponding transfer element(s) 720.

A plurality of error calculation elements 730 in the system 700 are used to calculate the payload output by each node of the output layer 424 and the payload obtained as reference by a transfer element 720 to determine an error between the two payloads (represented as E1 to EK, where K represents the number of nodes in the output layer 424). Those errors are added up by a summing unit 740 to calculate a sum of the errors. The sum of the errors may be used to adjust the parameter set of the channel equalization model 420, such as the mapping parameters between different layers, possible offset parameters, and so on. The system 700 may include a parameter adjustment unit (not shown) to apply adjustments (such as adjustment 1, adjustment 2, . . . , adjustment n, where n represents the number of mappings between adjacent layers) to corresponding parameters of the channel equalization model 420.

During the training, a plurality of training signals may be continuously input to the channel equalization model 420 so that the parameter set of the channel equalization model 420 is continuously optimized through the above process. In some embodiments, a loss function (for example, a cross entropy function) may be defined, which may be related to the sum of the errors calculated by the summing unit 740. By adjusting the parameter set, the value of the loss function may be continuously reduced. If the value of the loss function is minimized, it may be determined that the channel equalization model 420 is converged, and the current parameter set may be used to indicate the direct association between sampled symbols and payloads.

It should be appreciated that FIG. 7 only illustrates a specific example system for training the channel equalization model 420, and some elements in the system are provided for use in the training phase only and thus may be omitted during the application phase. In other embodiments, other training or learning methods may also be applied to determine the parameter set of the channel equalization model 420.

Figure 8:
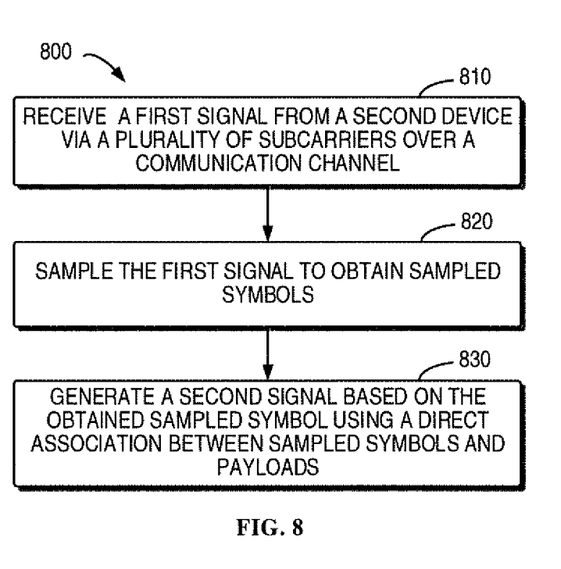
FIG. 8 illustrates a flowchart of a process for channel equalization in accordance with some embodiments of the present disclosure.

FIG. 8 illustrates a flowchart of a process 800 for channel equalization in accordance with some embodiments of the present disclosure. It should be appreciated that the process 800 may be implemented at the device 120 as illustrated in FIG. 1, and may be implemented by the system 300 in FIG. 3. For the convenience of discussion, the process 800 may be discussed in the following with reference to FIG. 1 and FIG. 3.

At 810, a receiver 122 of the device 120 (also referred to as a first device) receives a signal 302 (also referred to as a first signal) from the device 110 (also referred to as a second device) via a plurality of subcarriers over a communication channel. At 820, the sampler 310 of the device 120 samples the first signal 302 to obtain sampled symbols 304. At 830, the all-in-one equalizer 320 of the device 120 generates a signal 306 (also referred to as a second signal) based on the obtained sampled symbols 304 using a direct association between sampled symbols and payloads. The second signal 306 indicates a payload carried by the first signal 302 on an effective subcarrier of the plurality of subcarriers.

In some embodiments, the process 800 may further comprise receiving a training signal from the second device 110 via the plurality of subcarriers over the communication channel 102; sampling the training signal to obtain a training sampled symbols; obtaining a reference signal, the reference signal indicating a payload of the training signal carried on the effective subcarrier; and determining the direct association based on the training sampled symbols and the reference signal.

In some embodiments, determining the direct association may comprise determining a parameter set of a channel equalization model based on the training sampled symbols and the reference signal, the parameter set indicating the direct association.

In some embodiments, determining the direct association may further comprise: receiving, from the second device 110, first information indicating a parameter of frequency-time transformation and a length of a cyclic prefix for the second device 110; and determining a number of nodes in an input layer of the channel equalization model based on the parameter of the frequency-time transformation and the length of the cyclic prefix.

In some embodiments, determining the direct association may further comprise: receiving, from the second device 110, second information indicating a number of effective subcarriers; and determining a number of nodes in an output layer of the channel equalization model based on the number of effective subcarriers.

In some embodiments, obtaining the reference signal may comprise receiving the reference signal from the second device 110.

In some embodiments, the process 800 may further comprise transmitting, to the second device 110, a confirmation indication to indicate that the direct association has been determined.

In some embodiments, the communication channel 102 may comprise a wired communication channel or a wireless communication channel.

Figure 9:
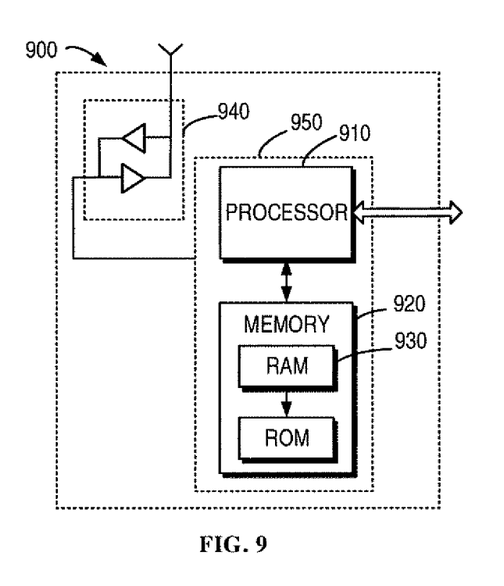
FIG. 9 illustrates a simplified block diagram of a device that is suitable for implementing embodiments of the present disclosure.

FIG. 9 is a simplified block diagram of a device 900 that is suitable for implementing embodiments of the present disclosure. The device 900 may be provided to implement a communication device, for example, the device 120 as shown in FIG. 1. As shown, the device 900 includes one or more processors 910, one or more memories 920 coupled to the processor(s) 910, and one or more transmitter and/or receivers (TX/RX) 940 coupled to the processor(s) 910.

The processor 910 may be of any type suitable to the local technical environment and may include one or more of the following: general purpose computers, special purpose computers, microprocessors, digital signal processors (DSPs), and processors based on multicore processor architecture, as non-limiting examples. The device 900 may have multiple processors, such as an application specific integrated circuit chip that is slaved in time to a clock which synchronizes the main processor.

The memory 920 may be of any type suitable to the local technical environment and may be implemented using any suitable data storage techniques. The memory 920 may include one or more non-transient computer readable storage medium, semiconductor-based storage devices, magnetic storage devices and systems, optical storage devices and systems, fixed memories, and removable memories.

The memory 920 stores at least a part of a computer program 930. The TX/RX 940 is for bidirectional communications. The TX/RX 940 has at least one antenna to facilitate communications. The communication interfaces may represent any interface that is necessary for communication with other devices.

If the program 930 includes program instructions, the program instructions, when executed by the associated processor(s) 910, cause the device 900 to implement the embodiments of the present disclosure as discussed with reference to FIG. 3 to FIG. 8. That is to say, the embodiments of the present disclosure may be implemented by computer software executable by the processor(s) 910 of the device 900 or by a combination of software and hardware.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. As an example, the embodiments of the present disclosure are described in the context of computer executable instructions which may be included in program modules, being executed in a device on a target physical or virtual processor. Generally, program modules include routines, programs, libraries, objects, classes, components, data structures, or the like that perform particular tasks or implement particular abstract data types. The functionality of the program modules may be combined or split between program modules as desired in various embodiments. Computer executable instructions for program modules may be executed within a local or distributed device. In a distributed device, program modules may be located in both local and remote storage media.

Computer program code for carrying out the methods of the present disclosure may be written in any combination of one or more programming languages. The program code may be provided to a processor of a general purpose computer, special purpose computer, or other programmable data processing apparatus, such that the program code, when executed by the processor or controller, cause the functionalities/operations specified in the flowcharts and/or block diagrams to be implemented. The program code may be executed entirely on a computer, partly on a computer, as a stand-alone software package, partly on the computer and partly on a remote computer or entirely on the remote computer or server.

In the context of the present disclosure, the computer readable medium may be any tangible medium that includes or stores a program used for or related to an instruction executing system, apparatus, or device. The computer readable medium may be a machine readable signal medium or a machine readable storage medium. The computer readable medium may include but is not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or flash memory), an optical storage device, a magnetic storage device, or any suitable combination of the above devices.

Further, while operations are depicted in a particular order, this should not be interpreted as requiring that such operations should be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Some features described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

We claim:

1. A method for channel equalization, comprising:
receiving, at a first device, a first signal from a second device via a plurality of subcarriers over a communication channel;
sampling the first signal to obtain sampled symbols; and
generating a second signal based on the obtained sampled symbols using a direct association between sampled symbols and payloads, the second signal indicating a payload of the first signal carried on an effective subcarrier of the plurality of subcarriers.

2. The method of claim 1, further comprising:
receiving a training signal from the second device via the plurality of subcarriers over the communication channel;
sampling the training signal to obtain training sampled symbols;
obtaining a reference signal, the reference signal indicating a payload of the training signal carried on the effective subcarrier; and
determining the direct association based on the training sampled symbols and the reference signal.

3. The method of claim 2, wherein determining the direct association comprises:
determining a parameter set of a channel equalization model based on the training sampled symbols and the reference signal, the parameter set indicating the direct association.

4. The method of claim 3, wherein determining the direct association further comprises:

receiving, from the second device, first information indicating a parameter of frequency-time transformation and a length of a cyclic prefix for the second device; and
determining a number of nodes in an input layer of the channel equalization model based on the parameter of the frequency-time transformation and the length of the cyclic prefix.

5. The method of claim 3, wherein determining the direct association further comprises:
receiving, from the second device, second information indicating a number of effective subcarriers; and
determining a number of nodes in an output layer of the channel equalization model based on the number of effective subcarriers.

6. The method of claim 2, wherein obtaining the reference signal comprises:
receiving the reference signal from the second device.

7. The method of claim 2, further comprising:
transmitting, to the second device, a confirmation indication to indicate that the direct association has been determined.

8. The method of claim 1, wherein the communication channel comprises a wired communication channel or a wireless communication channel.

9. A device for channel equalization, comprising:
a processor; and
a memory coupled to the processor and having instructions stored therein, the instructions, when executed by the processor, causing the device to perform acts of:
receiving a first signal from a further device via a plurality of subcarriers over a communication channel;
sampling the first signal to obtain sampled symbols; and
generating a second signal based on the obtained sampled symbols using a direct association between sampled symbols and payloads, the second signal indicating a payload of the first signal carried on an effective subcarrier of the plurality of subcarriers.

10. The device of claim 9, the acts further comprising:
receiving a training signal from the further device via the plurality of subcarriers over the communication channel;
sampling the training signal to obtain training sampled symbols;
obtaining a reference signal, the reference signal indicating a payload of the training signal carried on the effective subcarrier; and
determining the direct association based on the training sampled symbols and the reference signal.

11. The device of claim 10, wherein determining the direct association comprises:
determining a parameter set of a channel equalization model based on the training sampled symbols and the reference signal, the parameter set indicating the direct association.

12. The device of claim 11, wherein determining the direct association further comprises:
receiving, from the further device, first information indicating a parameter of frequency-time transformation and a length of a cyclic prefix for the further device; and
determining a number of nodes in an input layer of the channel equalization model based on the parameter of the frequency-time transformation and the length of the cyclic prefix.

13. The device of claim 11, wherein determining the direct association further comprises:
- receiving, from the further device, second information indicating a number of effective subcarriers; and
- determining a number of nodes in an output layer of the channel equalization model based on the number of effective subcarriers.

14. The device of claim 10, wherein obtaining the reference signal comprises:
- receiving the reference signal from the further device.

15. The device of claim 10, the acts further comprising:
- transmitting, to the further device, a confirmation indication to indicate that the direct association has been determined.

16. The device of claim 9, wherein the communication channel comprises a wired communication channel or a wireless communication channel.

17. A non-transitory computer readable medium having computer executable instructions stored thereon which, when executed by one or more processors of a first device, cause the first device to:
- receive a first signal from a second device via a plurality of subcarriers over a communication channel;
- sample the first signal to obtain sampled symbols; and
- generate a second signal based on the obtained sampled symbols using a direct association between sampled symbols and payloads, the second signal indicating a payload of the first signal carried on an effective subcarrier of the plurality of subcarriers.

18. The non-transitory computer readable medium of claim 17, wherein the computer executable instructions, when executed by the one or more processors of the first device, further cause the first device to:
- receive a training signal from the second device via the plurality of subcarriers over the communication channel;
- sample the training signal to obtain training sampled symbols;
- obtain a reference signal, the reference signal indicating a payload of the training signal carried on the effective subcarrier; and
- determine the direct association based on the training sampled symbols and the reference signal.

19. The non-transitory computer readable medium of claim 18, wherein the computer executable instructions, when executed by the one or more processors of the first device, cause the first device to determine the direct association by:
- determining a parameter set of a channel equalization model based on the training sampled symbols and the reference signal, the parameter set indicating the direct association.

20. The non-transitory computer readable medium of claim 19, wherein the computer executable instructions, when executed by the one or more processors of the first device, cause the first device to determine the direct association by further causing the first device to:
- receive, from the second device, first information indicating a parameter of frequency-time transformation and a length of a cyclic prefix for the second device; and
- determine a number of nodes in an input layer of the channel equalization model based on the parameter of the frequency-time transformation and the length of the cyclic prefix.

21. The non-transitory computer readable medium of claim 19, wherein the computer executable instructions, when executed by the one or more processors of the first device, cause the first device to determine the direct association by further causing the first device to:
- receive, from the second device, second information indicating a number of effective subcarriers; and
- determine a number of nodes in an output layer of the channel equalization model based on the number of effective subcarriers.

22. The non-transitory computer readable medium of claim 18, wherein the computer executable instructions, when executed by the one or more processors of the first device, cause the first device to obtain the reference signal by:
- receiving the reference signal from the second device.

23. The non-transitory computer readable medium of claim 18, wherein the computer executable instructions, when executed by the one or more processors of the first device, further cause the first device to:
- transmit, to the second device, a confirmation indication to indicate that the direct association has been determined.

24. The non-transitory computer readable medium of claim 17, wherein the communication channel comprises a wired communication channel or a wireless communication channel.

* * * * *